Nov. 21, 1933.　　　　　J. CORBETT　　　　　1,936,498

COMBINED DRILL AND COUNTERSINK OR THE LIKE AND METHOD OF MAKING SAME

Filed March 8, 1933

Inventor
James Corbett
W. E. Schoenborn
By
Attorney

Patented Nov. 21, 1933

1,936,498

UNITED STATES PATENT OFFICE 1,936,498

COMBINED DRILL AND COUNTERSINK OR THE LIKE AND METHOD OF MAKING SAME

James Corbett, Providence, R. I.

Application March 8, 1933. Serial No. 660,062

7 Claims. (Cl. 76—108)

This invention relates to combination drills and countersinks or the like and to a method of manufacturing the same.

The conventional type of drill and countersink, as now manufactured, is a one-piece device, and it is unsatisfactory in use for the reason that it is subject to a high rate of breakage. The reason for this is that the temper of the drill is different from that of the countersink and body of the tool. In the course of manufacture, when the tool is heated prior to receiving its tempering bath, when the body of the tool is heated to the requisite temperature, the projecting drill portion, which is necessarily of smaller diameter, becomes over heated. This results in a fracture in the metal of the tool between its body and its point with the result that while the body and countersink receive the proper temper the point does not. Consequently, the finished tool possesses the above mentioned tendency towards breakage along the plane of fracture between the body and the point.

The principal object of this invention is the production of a combination drill and countersink wherein the body and point will possess an equal and proper degree of temper.

Another object of the invention is the production of such a tool of an initial plurality of parts which are integrally united or attached in the finished article.

A further object of the invention is the automatic production of such a tool by a novel and efficient method or process of manufacture at a minimum of cost and steps of operation.

With these and other objects in view, such as will be apparent during the course of the following description, the invention consists, in general, of the production of a combination drill and countersink having the structural characteristics and arrangement of parts, as illustrated in the accompanying one sheet of drawing, and manufactured in the manner described in the following description and particularly pointed out in the appended claims:

In the drawing, wherein like characters of reference are used to indicate like parts in the several views, Figure 1 is a side elevation of the parts of the tool shown in unassembled relation;

Figure 1:
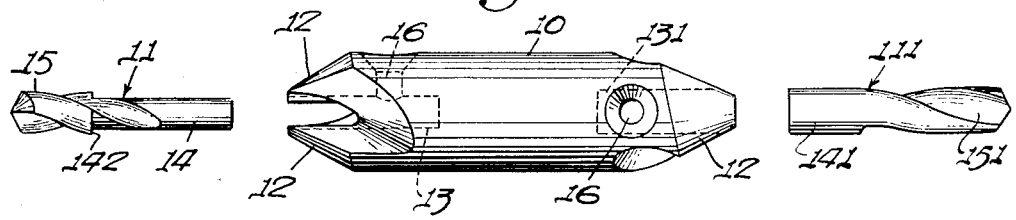
Figure 2:
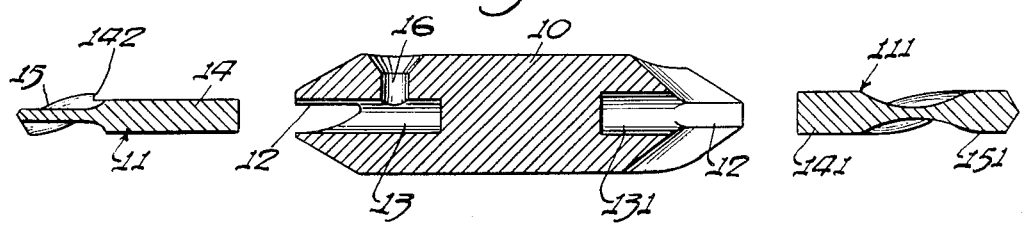
Figure 2 is a vertical sectional view of the same.
Figure 3:
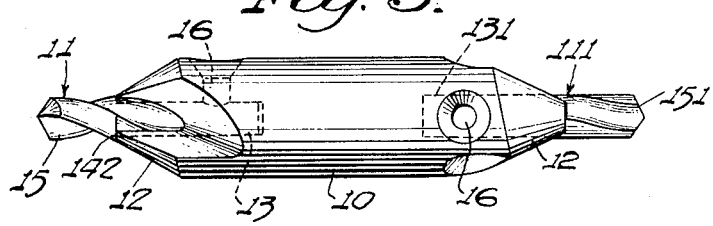
Figure 3 is a view similar to Figure 1, but showing the parts in assembled relation.

Referring to the drawing, wherein, as an illustrative example, there is shown a double ended drill and countersink, the tool consists of a cylindrical body member 10 and two drill bits 11 and 111. The body member 10 is provided, at its opposite ends, with countersink cutters 12, and, from each end, it is centrally bored to form recesses 13 and 131 adapted to receive the cylindrical shanks 14 and 141 of the drill bits 11 and 111. These drill bits are, in turn, provided with cutters 15 and 151.

A pair of apertures 16 are drilled or formed in the side wall of the body member 10, and bases of which apertures communicate, respectively, with the interior of the recesses 13 and 131.

In the manufacture of this tool, the body member 10 and the drill bits 11 and 111 are first properly fabricated.

Figure 4:
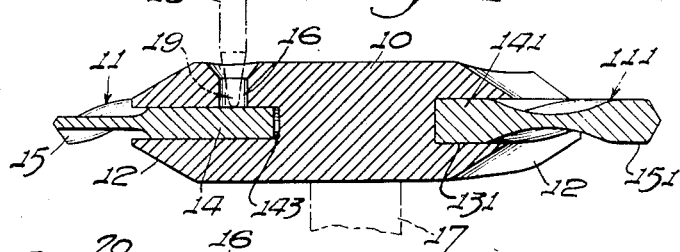
Figure 4 is a vertical sectional view of the same.
Figure 5:
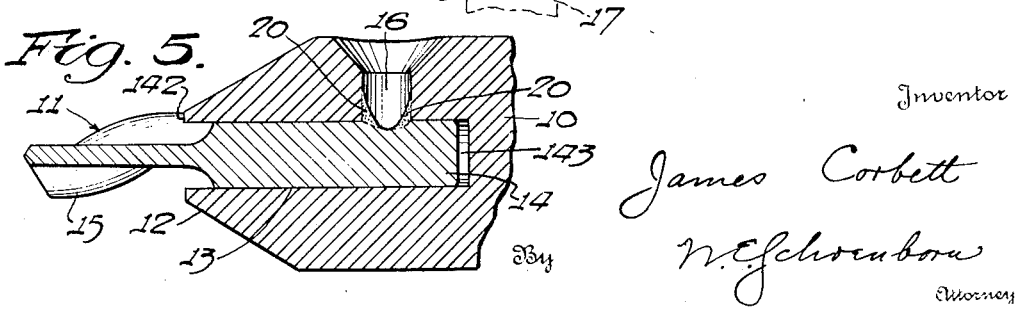
Figure 5 is a fragmentary view on an enlarged scale and similar to a portion of Figure 4, illustrating in greater detail a certain feature of the invention.

The drill bit 11 shown on the left end of said body member 10 and recess 13 are smaller in diameter than the recess 131. The shank 14 of the drill bit 11 is machined or turned to form a shoulder 142 which abuts against the outer end of the countersink cutter 12, and there is also provided a clearance 143 between the inner end of the drill bit shank 14 and the bottom of the recess 13, as clearly shown in Figures 4 and 5, which construction insures added strength to said countersink 12 and at the same time permits the quick and proper depth assembling of said drill bit 11 into the recess 13 of body member 10 and effects the boring of a smooth or cleaner hole in view of the curvature of the cutting edges 15 of the drill bit 11 properly merging into and corresponding to the curvature of the cutting edges of said countersink 12, as depicted in Figure 5.

The drill bit 111 shown on the right of the body member is similar to that of drill bit 11, except that its shank 141 is slightly larger in diameter than shank 14 and is not provided with a shoulder 142, as shown in connection with drill bit 11, and needs no further disclosure.

While I have shown, as described, the body 10 provided with a drill and countersink at each of its ends, it will be readily understood that this is not essential and either one or both of said forms of drill bits 11 or 111 can be used without departing from the broad scope of the invention, and are only so shown and described to prevent a multiplicity of figures of drawing to disclose the modified forms of applicant's invention, and to which the novel process can be applied.

The drill bit members 11 and 111 and its cooperating body member 10 with the integral countersink cutters 12 are made of any regular and, preferably, high speed eighteen per cent tungsten steel, sold by the reputable steel manufacturers, and separately and individually tempered to an equal degree of hardness by being individually heated to the proper degree of between 2300 to 2400 degrees Fahrenheit, then cooled and tempered in a bath of oil, and finally properly tempered and annealed in an electric furnace maintained approximately at a temperature of 1080 degrees Fahrenheit.

By this manner of separate and above disclosed treatment of the several parts and even or uniform temper for all portions of the tool, an equal degree of strength is assured throughout its entire structure.

After said drill bit member 11 and body member 10 are properly tempered, the said drill bit 11 whose shank 14 has, preferably, been made one thousandth of an inch in diameter greater than the diameter of its cooperating or receiving recess 13, the shrinkage of the body member 10 upon cooling will firmly hold the drill bit 11 within said recess, while the displacing of that portion of the shank 14 exposed at and adjacent to the bottom of the aperture 16 is electrically carried out by applicant's new process, to be presently described, to integrally build up a unitary combined drill and countersink. After the shank 14 of the drill bit 11 is properly seated and held in the recess 13, as above described, the base terminal or electrode 17 of the electric circuit is brought and held in contact with body member 10 of the tool at any desired point, and, preferably, at its middle section, in any suitable manner, as indicated, for instance, by the dotted line at 17, Figure 4.

The operating electrode or pencil 18 carrying a melting or welding circuit of approximately twenty-five volts and one hundred seventy-five amperes is then inserted into the aperture 16 so that its point 19 is brought in contact with the curved surface of the shank 14 at the bottom of aperture 16, and, also, if desired, to the lowest portion of the wall of aperture 16 adjacent shank 14, which operation or operations will fuse the metal of the shank 14 and permit the same to be displaced so that it can be made to assume a position, after being permitted to cool or congeal, as a slightly curved annular portion or section of solid metal within and at the bottom of the aperture 16 fused integrally with said shank 14 and rigidly held in contact with the wall of the body member 10 at the bottom of its aperture 16, as indicated at 20 of Figure 5. The displacement is obtained by pushing down the electrode or pencil into the molten metal.

From the foregoing operation of the pencil point 19, the exposed metal of the drill shank 14 at the bottom of aperture 16 is only melted or fused and displaced or raised upwards into the aperture 16, or fused around and in contact with the lower section of the aperture 16, which two operations or steps may be carried out simultaneously, or if found that owing to the amount of metal displaced solely from the shank 14 is sufficient to build up the cooled or congealed and annular portion 20 within the aperture 16, as shown in Figure 5, the contacting of the pencil point 19 with the wall of the aperture 16 may be omitted without departing from the spirit of the present invention.

As will be seen from the foregoing description and operation of the method employed in the present invention, the melting and fusion of metal is not only satisfactorily produced by the arcing or actual contact of the point 19 but the displacement and desired disposition or arrangement of the fused metal in the aperture 16 is also immediately effected by said point 19 and without the addition or use of any other extraneous metal or material. The heat engendered by the application of point 19 is localized and concentrated and not permitted to be dissipated over the entire tool, and, hence, no material and injurious effect is had upon the previously prepared temper necessary for the proper drilling or boring properties of the drill bit cutters 15 or countersink cutters 12.

From the foregoing disclosure, it will be seen that there has been produced, by an efficient and novel process, a built up combined drill and countersink in which the parts are of proper and desired temper and strength throughout, and said parts are securely and integrally united at a minimum of cost and steps involved in said process without the addition of any other material after the parts of the tool are assembled for the application of the steps of herein disclosed novel process.

It is to be understood that while the form of the invention shown and described is a preferred embodiment, changes in the form, shape, size, and other arrangement of parts, as, for example, in counterbore drills or the like, may be readily suggested and be made without departure from the spirit of the invention insofar as such modifications fall within the scope of the appended claims.

What I claim is:

1. A tool of the character set forth, comprising a metallic body member having a countersink cutter at one end and provided at such end with a longitudinal recess, a metallic drill bit having its shank contained in said recess, said body member having an aperture at an angle and in communication with said recess, and said shank of the drill bit immovably retained within said recess by congealed metal at bottom of said aperture, said congealed metal having been electrically fused and displaced from the portion of the shank exposed and contiguous to said aperture.

2. A tool of the character set forth, comprising a metallic body member having a countersink cutter at one end and provided at such end with a longitudinal recess, a metallic drill bit having its shank contained in said recess, said body member having an aperture in communication with and normally arranged to said recess, and said shank of the drill bit immovably retained within said recess by congealed metal at bottom of said aperture and rigidly attached to said shank and body member, said congealed metal having been solely and electrically fused and displaced from the section of the shank exposed at the aperture opening communicating with said longitudinal recess.

3. A tool of the character set forth, comprising a metallic body member having a countersink cutter at one end and provided at such end with a longitudinal recess, a metallic drill bit having its shank contained in said recess, said body member having an aperture at an angle and in communication with said recess, and said shank of the drill bit immovably retained within said recess by congealed metal at bottom of said aperture and attached to said shank and body member, said congealed metal having been electrically fused from the lower portion of the wall of said aperture contiguous to said shank and from the section of the shank exposed at the aperture opening and displaced upwardly into said aperture.

4. The method of manufacturing a tool of the character described, which comprises fabricating a metallic body member having at one end a countersink cutter and provided with a longitudinal recess and an aperture at an angle and communicating with said recess, a drill bit member having a shank, inserting said shank of said drill bit into the recess of said body member and having a portion of said shank exposed and visible through said aperture, inserting an electrode in said aperture in contact with said exposed and visible portion of said shank and electrically fusing or melting said exposed metallic portion of said shank, displacing said fused metal upwardly into said aperture, and permitting said fused metal to cool.

5. The method of manufacturing a tool of the character described, which comprises fabricating a metallic body member having at one end a countersink cutter and provided with a central longitudinal recess and a lateral aperture communicating with and normally arranged to said recess, a drill bit member having a shank, separately tempering said body and drill bit members, inserting said shank of said drill bit into the longitudinal recess of said body member and having a portion of said shank exposed and visible through said aperture, inserting an electrode in said aperture in contact with said exposed and visible portion of said shank, and electrically fusing or melting said exposed metallic portion of said shank, displacing said fused metal upwardly into said aperture, and permitting said fused metal to cool.

6. The method of manufacturing a tool of the character described, which comprises fabricating a metallic body member having at one end a countersink cutter and provided with a central longitudinal recess and a lateral aperture communicating with said recess, a drill bit member having a shank, inserting said shank of said drill bit into the longitudinal recess of said body member and having a portion of said shank exposed and visible through said aperture, inserting an electrode in said aperture in contact with the portion of the body member forming the wall of said aperture contiguous to said shank and the adjacent section of said shank and electrically fusing or melting and mixing said fused metallic portions of body member and shank, displacing said fused mixture upwardly into said aperture, and permitting said fused mixed metal to cool.

7. A method of uniting two metallic members, one of said members having a longitudinal recess and a lateral aperture communicating with said recess, and the second member having a shank which consists in inserting the shank of said second member in said recess of the first member so that a portion of said shank is visible through said aperture, inserting an electrode in contact with said exposed visible portion of said shank, electrically fusing or melting a part of said exposed portion of said shank, displacing upwardly said fused portion into contact with the aperture wall contiguous to said shank, and permitting said fused metal to cool.

JAMES CORBETT.